(12) United States Patent
Limb et al.

(10) Patent No.: US 12,712,905 B2
(45) Date of Patent: Aug. 18, 2026

(54) EVALUATING NETWORK FLOW RISKS

(71) Applicant: Sophos Limited, Abingdon (GB)

(72) Inventors: John Franklin Limb, Herriman, UT (US); Neil Richard Terry, Cedar Hills, UT (US); James B. Anderson, Rincon, GA (US)

(73) Assignee: Sophos Limited, Abingdon (GB)

( * ) Notice: Subject to any disclaimer, the term of this patent is extended or adjusted under 35 U.S.C. 154(b) by 746 days.

(21) Appl. No.: 17/946,733

(22) Filed: Sep. 16, 2022

(65) Prior Publication Data

US 2024/0098108 A1 Mar. 21, 2024

(51) Int. Cl.
*H04L 9/00* (2022.01)
*H04L 9/40* (2022.01)
*H04L 45/7453* (2022.01)

(52) U.S. Cl.
CPC ...... *H04L 63/1433* (2013.01); *H04L 45/7453* (2013.01)

(58) Field of Classification Search
CPC .................................................. H04L 63/1433
See application file for complete search history.

(56) References Cited

U.S. PATENT DOCUMENTS

2015/0106932 A1* 4/2015 Mesec ................ H04Q 11/0005 726/23
2016/0352765 A1* 12/2016 Mermoud ........... H04L 63/1458
2016/0381070 A1* 12/2016 Zhang ................. H04L 63/1466 726/23
2018/0295148 A1* 10/2018 Mayorgo .............. H04L 63/105
2019/0387005 A1 12/2019 Zawoad et al.
2021/0306354 A1* 9/2021 Raghuramu .......... H04L 67/535
2022/0129560 A1* 4/2022 Bulut ..................... G06N 20/00

* cited by examiner

*Primary Examiner* — Christopher J Brown
(74) *Attorney, Agent, or Firm* — Strategic Patents, P.C.

(57) ABSTRACT

A cluster of network flows is formed on the basis of a particular entity-to-entity relationship, and individual network flows within the cluster are further identified on an application-by-application basis to better characterize communications between two compute instances connected through a data network. By individually scoring network flows for each application with a variety of tools, and aggregating these individual scores into a composite score for the cluster of network flows, more accurate threat detections can be supported based on an increase in relevant threat data and a more complete view of risk factors.

20 Claims, 4 Drawing Sheets

EVALUATING NETWORK FLOW RISKS

FIELD

The present disclosure relates to techniques for evaluating risks associated with network flows.

BACKGROUND

Identifying a novel threat based on a single network flow or a single detection engine can be problematic. Typically, a single network flow or single detection engine may provide information (or evidence) of a potential malware event or other cybersecurity threat. However, in most cases, the amount of evidence obtained by the single network flow or the single detection engine is not enough to accurately confirm that the malware event or cybersecurity threat has, in fact, been detected.

Accordingly, there remains a need for risk assessments in a networked environment that combine evidence from aggregated network flows between various elements within the networked environment, e.g., a client and a server, and aggregated risk data from multiple risk assessment tools.

SUMMARY

A cluster of network flows is formed on the basis of a particular entity-to-entity relationship, and individual network flows within the cluster are further identified on an application-by-application basis to better characterize communications between two compute instances connected through a data network. By individually scoring network flows for each application with a variety of tools, and aggregating these individual scores into a composite score for the cluster of network flows, more accurate threat detections can be supported based on an increase in relevant threat data and a more complete view of risk factors.

In an aspect, a computer program product disclosed herein may include computer executable code embodied in a non-transitory computer-readable medium that, when executing on one or more computing devices, causes the one or more computing devices to perform the steps of: creating an identifier for a cluster of network flows between two compute instances using a first hash of at least a source Internet Protocol (IP) address for the network flows, a destination IP address for the network flows, a destination port for the network flows, and a protocol for the network flows; creating a sub-identifier for each of the network flows in the cluster of network flows using a second hash of at least a source port for a corresponding one of the network flows; scoring each one of the network flows for each one of the sub-identifiers using a metric for each of a number of security risks, thereby providing a number of scored metrics for each of the network flows, each of the scored metrics evaluating one of the security risks for a corresponding one of the network flows; for each of the security risks, combining a corresponding one of the score metrics for each of the network flows into an aggregated metric score for the cluster, thereby obtaining a number of aggregated metric scores for the cluster; summing the aggregated metric scores for each of the security risks into an aggregated risk score for the cluster of network flows; and initiating a remedial action when the aggregated risk score meets a predetermined threshold.

Implementations may include one or more of the following features. Each of the number of aggregated metric scores may include a weighted combination of an average of score metrics for the one of the security risks and a maximum of score metrics for the one of the security risks. The aggregated risk score may be calculated based on a sum of the weighted combination. The first hash may include an ordered hash of the source IP address for the network flows, the destination IP address for the network flows, the destination port for the network flows, and a Layer 7 protocol for the network flows. The second hash may include an ordered hash of a start time for a connection for the corresponding one of the network flows, the source IP address for the corresponding one of the network flows, the destination IP address for the corresponding one of the network flows, the destination port for the corresponding one of the network flows, a source port for the corresponding one of the network flows, and a Layer 7 protocol for the one of the network flows.

In an aspect, a method disclosed herein may include: identifying a cluster of network flows between a source associated with an enterprise network and a destination external to the enterprise network based on at least a source address and a destination address for the network flows; identifying a number of network flows in the cluster of network flows between the source and the destination based on at least a source port for each one of the network flows; scoring each one of the network flows using a metric for each of a number of security risks, thereby providing a number of scored metrics for each one of the network flows; combining the number of scored metrics for each of the network flows into an aggregated risk score for the cluster of network flows; and initiating a remedial action when the aggregated risk score meets a predetermined threshold.

Implementations may include one or more of the following features. The source may include a client associated with an enterprise network and the destination may include a server externally coupled to the enterprise network. The remedial action may include a remedial action directed to the client. The remedial action may include one or more of a quarantine of the source, a malware scan of the source, a software update to the source, and an alert to an administrator. Combining the number of scored metrics may include calculating an average and a maximum for each of the security risks assessed for each network flow. The method may further include calculating a category risk score for each of the security risks based on a weighted combination of the average and the maximum for that one of the security risks. The method may further include summing the category risk score for each of the security risks to provide the aggregated risk score for the cluster of network flows in the cluster. One of the metric scores may be a flag indicating that the source is an only compute instance in the enterprise network communicating with the destination. One of the metric scores may be generated by a machine learning algorithm. The machine learning algorithm may score the network flows based on a domain name or an encrypted payload analysis. One of the metric scores may be based on a type of threat for one of the network flows determined using indicators of compromise. One of the metric scores may be based on a count of predetermined events associated with one of the network flows.

In an aspect, a system disclosed herein may include: a source including a compute instance associated with an enterprise network; a destination including a server; and a threat management facility for the enterprise network. The threat management facility may be configured to monitor a connection between the compute instance and the server, and to assess risks associated with the connection by performing the steps of: identifying a cluster of network flows between the source and the destination based on at least a source address and a destination address for the network flows; identifying a number of network flows in the cluster of network flows between the source and the destination based on at least a source port for each one of the network flows; scoring each one of the network flows using a metric for each of a number of security risks, thereby providing a number of scored metrics for each one of the network flows; combining the number of scored metrics for each of the network flows into an aggregated risk score for the cluster of network flows; and initiating a remedial action when the aggregated risk score meets a predetermined threshold.

Implementations may include one or more of the following features. The destination may be a server external to the enterprise network. Scoring each one of the network flows includes scoring each one of the network flows with a machine learning algorithm (and/or model) trained to evaluate network flows for severity of security risk.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Figure 1:
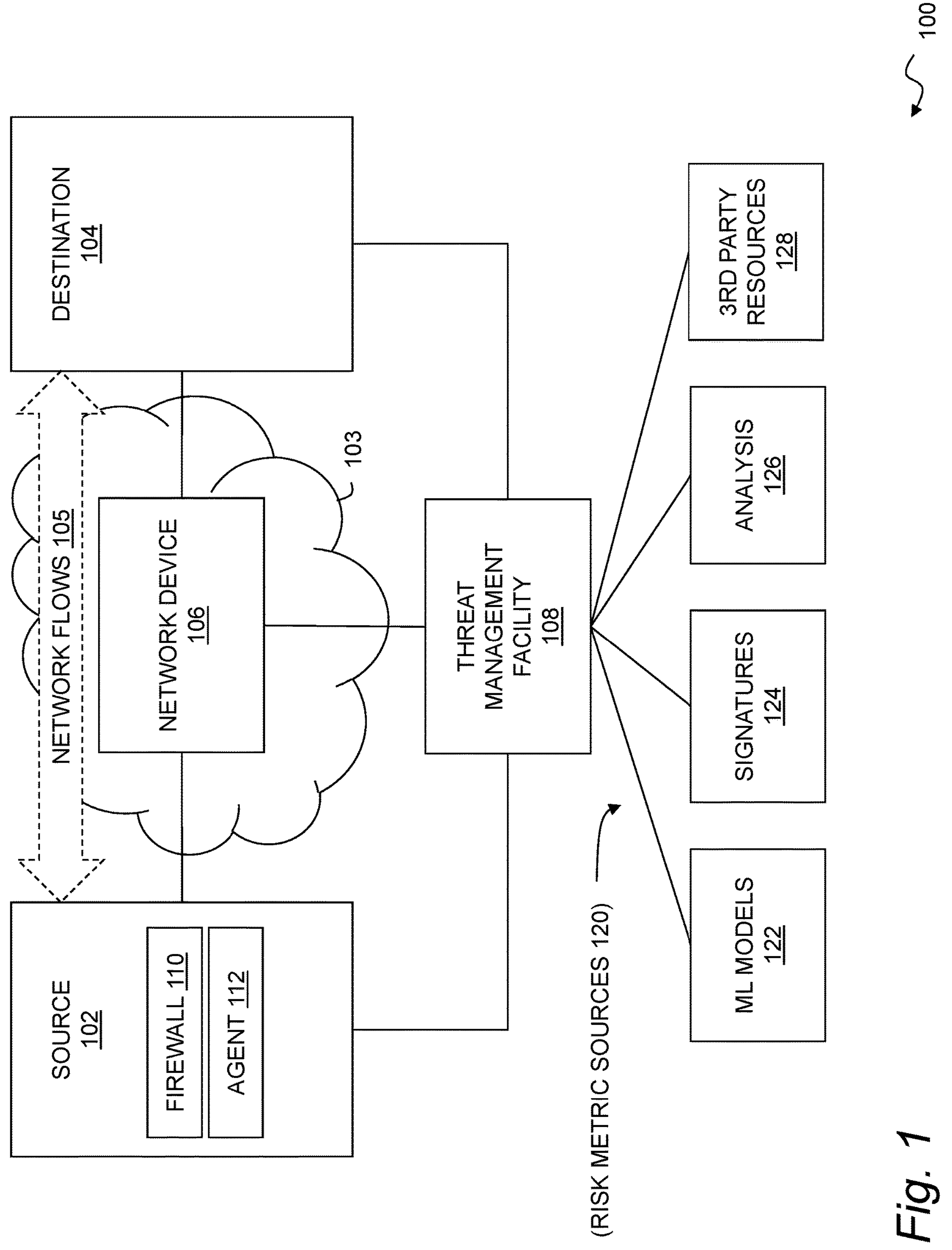
FIG. 1 illustrates computing devices communicating through a data network.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth.

Recitation of ranges of values herein are not intended to be limiting, referring instead individually to any and all values falling within the range, unless otherwise indicated herein, and each separate value within such a range is incorporated into the specification as if it were individually recited herein. The words “about,” “approximately” or the like, when accompanying a numerical value, are to be construed as indicating a deviation as would be appreciated by one of ordinary skill in the art to operate satisfactorily for an intended purpose. Similarly, words of approximation such as “approximately” or “substantially” when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language (“e.g.,” “such as,” or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as “first,” “second,” “top,” “bottom,” “up,” “down,” and the like, are words of convenience and are not to be construed as limiting terms.

It should also be understood that endpoints, devices, compute instances, or the like that are referred to as “within” an enterprise network may also be “associated with” the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

FIG. 1 is a block diagram of a system including computing devices communicating through a data network. In general, the system 100 may include a source 102 and a destination 104 coupled through a data network 103 that includes at least one network device 106. The data network 103 may generally support network flows 105 between the source 102 and the destination 104. The system 100 may also include a threat management facility 108 that supports various network security functions as described herein.

The source 102 may be any endpoint, compute instance, or other physical or virtual computing device. For example, the source 102 may be a compute instance located in an enterprise network, such as any of the enterprise networks described in U.S. Pat. Pub. No. 2021/0397738, the entire content of which is hereby incorporated by reference. The source 102 may also or instead include a client communicating with remote resources through the data network 103, which may include any combination of public and private internetworks supporting data communications among computing devices. The data network 103 may, for example, include an enterprise network associated with an organization, a public network such as the Internet, a cellular data network, or any combination of these and other public and/or private networks, and so forth.

The destination 104 may include an endpoint, a compute instance, or any other physical or virtual computing device. For example, the destination 104 may be located in an enterprise network, or outside of the enterprise network. In one aspect, the destination 104 is a server coupled in a communicating relationship with the source 102 through the data network 103, such as a server external to an enterprise network or a server inside the enterprise network. It will be understood that, while a source 102 may initiate communications with a destination 104, communications between the source 102 and destination 104 will typically be bi-directional, and network flows 105 may travel in both directions between these devices.

The network device 106 may be coupled between the source 102 and destination 104 to support communications therebetween. It will be understood that, while a single network device 106 is shown for purposes of illustration, the data network 103 may include any number and arrangement of network devices 106 suitable for interconnecting the source 102 and destination 104 in a communicating relationship. The network devices 106 may, for example, include one or more access points, routers, switches, gateways, firewalls, and so forth. While the network device 106 is illustrated as positioned between the source 102 and the destination 104, it will be understood that the network device 106 may also or instead be a component of the source 102 or destination 104. For example, the network device 106 may include hardware and/or software associated with the source 102 or with destination 104, such as a local firewall for the source 102 that serves as a network device 106 for the purposes of this disclosure, such as by monitoring network traffic to and from a client and providing network flow information to the threat management facility 108.

The threat management facility 108 may include any on-premises, cloud-based, or other threat management tool or resource for an enterprise network, as well as combinations of the foregoing. By way of non-limiting examples, the threat management facility 108 may include any of the threat management facilities described in U.S. Pat. Pub. No. 2021/0397738, the entire content of which is hereby incorporated by reference. In general, the threat management facility 108 may monitor network flows between the source 102 and the destination 104 in order to assess and address threats to the enterprise network. In one aspect, this may include monitoring network flow data provided by the source 102, such as network flow data from a hardware or software firewall 110 on the source 102, or a local security agent 112 executing on the source 102 and in communication with the threat management facility 108. Examples of network flow data include, but are not limited to web server traffic, user activity data for registered enterprise users, or any other data that might be provided by the destination 104 to network users or administrators. The threat management facility 108 may also receive network flow data from the destination 104, to the extent that the destination 104 is instrumented to monitor network flow data and provide such data, or data derived therefrom, to the threat management facility 108. The threat management facility 108 may also or instead received data from any network device 106, particularly where the network device 106 is either within an enterprise network shared by the threat management facility 108 or configured to monitor network flows 105 and provide corresponding network flow data to a remote resource such as the threat management facility 108.

In general, the system 100 may include sources for one or more risk metric sources 120 to support risk evaluation by the threat management facility 108. This may include any risk scoring resources locally available to the threat management facility 108 such as local rules, reputation data, policy information, and the like for an enterprise associated with the threat management facility 108. This may also include a variety of supplemental sources. For example, the threat management facility may use machine learning models 122 trained to estimate a likelihood of risk based on a number of known safe and risky samples. This may also or instead include signature lookups 124 that evaluate risk using signatures or any other suitable objective criteria for detection that can be identified within the network flows 105 (or network flow context). This may also or instead include analysis 126 such as code or content analysis, which may be performed statically by analyzing binary or source code, or other digital content within the network flows 105, or dynamic/behavioral analysis, which may be performed by executing code located within the network flows 105, e.g., using a sandbox or similar safe execution environment. This may also or instead include third party resources 124 that can receive data from the threat management facility 108 and provide risk scores or assessments to the threat management facility 108 using any suitable techniques, rules, algorithms, lookups, and so forth. More generally, any resource or combination of resources suitable for analyzing network flows 105 and providing objective scoring data may be used as risk metric sources 120, including internal tools executed locally and/or managed by the threat management facility 108, and external tools executed and/or managed by third parties and provided as services to the threat management facility 108.

Figure 2:
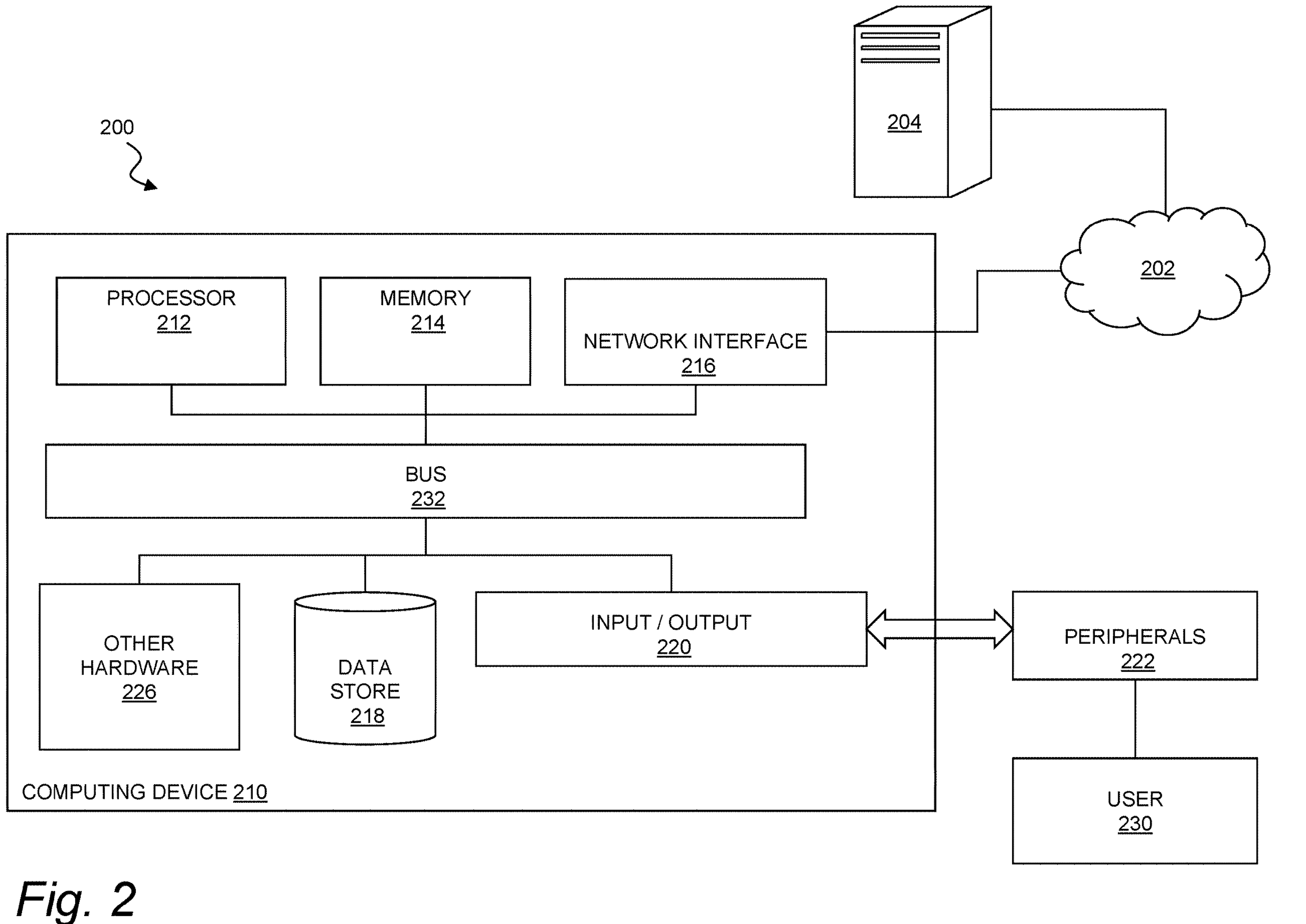
FIG. 2 illustrates a block diagram of a computer system.

FIG. 2 is a block diagram of a computer system. Each of the devices or combination of devices described herein may be deployed on one or more physical computers, one or more virtual computers, or some combination thereof. FIG. 2 illustrates an example arrangement of hardware suitable for providing the corresponding computing resources for embodying these systems and any methods deployed thereon. In general, the computer system 200 may include a computing device 210 connected to a network 202, e.g., through an external device 204. The computing device 210 may be or may include any type of network device, network endpoint, or other computing device or the like as described herein, e.g., any of the computing entities shown and described above. For example, the computing device 210 may include a desktop computer workstation. The computing device 210 may also or instead be any suitable end user device that has a processor and communicates over a network 202, including without limitation a laptop computer, a desktop computer, a personal digital assistant, a tablet, a mobile phone, a television, a set top box, a wearable computer, a home device (e.g., a thermostat or a home appliance controller), and so forth. The computing device 210 may also or instead include a network device such as a firewall, a gateway, a switch, a router, an access point, and so forth. The computing device 210 may also or instead include a server or other device providing services to remote devices through a data network.

The computing device 210 may be used for any of the entities described in the environment 100 described above with reference to FIG. 1. For example, the computing device 210 be a server hosting the security operations platform 106, a server hosting the cloud computing deployment 116 of the enterprise solution, or any other virtual or physical device in the on-premises deployment 114 of an enterprise solution, or any of the other facilities or computing devices described herein. In certain aspects, the computing device 210 may be implemented using hardware or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMAX-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any processor(s) and/or processing circuitry suitable for providing computing resources as contemplated herein, and may in general be capable of processing instructions for execution within the computing device 210 or computer system 200. The processor 212 may include a single-core processor, a multi-core processor, a graphics processing unit, or any other type of processor or processing circuitry. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMAX connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMAX) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
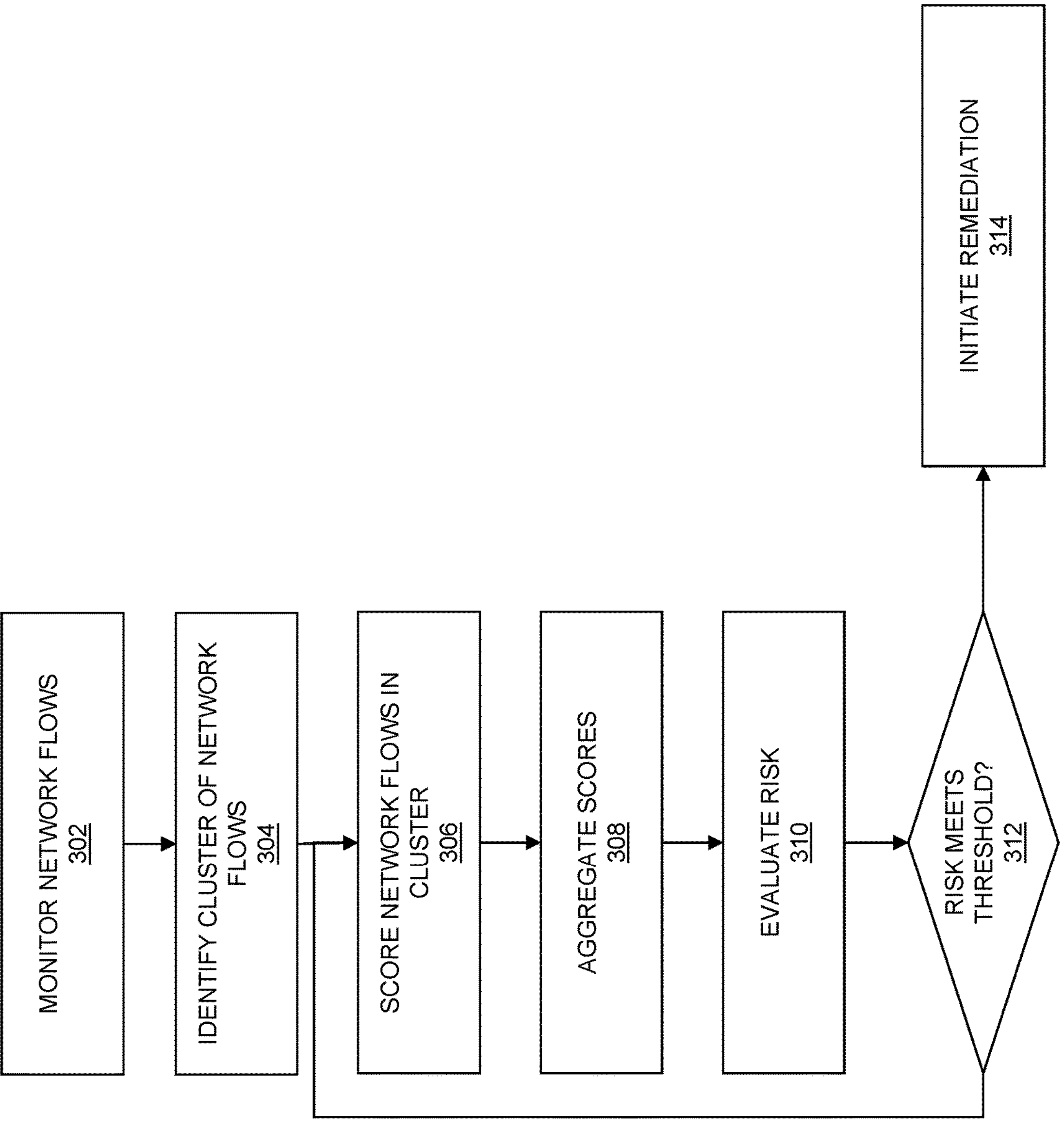
FIG. 3 shows a method for evaluating network flow risks.

FIG. 3 shows a method for evaluating network flow risks. In general, the method 300 may be realized in computer executable code deployed, e.g., on a threat management facility for an enterprise network, such as any of the threat management facilities and enterprise networks described herein, or any similar or related environment.

As shown in step 302, the method 300 may include monitoring one or more network flows, such as any of the network flows described herein. This may include receiving information about network flows from one or more of the sources, destinations, and/or network devices described herein. For example, this may include monitoring network flows between a source and a destination where the source includes a client associated with an enterprise network and the destination includes a server externally coupled to the enterprise network. For purposes of scoring, network flow data may include data from any of these devices. For example, network flow data may be obtained from local monitoring software, security software, applications, and the like executing on a client device. Network flow data may also or instead be obtained from monitoring software or other instrumentation executing on a network device between the source and destination. In one aspect, the network flow data may include analysis from third party resources that support a threat management facility in assessing riskiness based on context and content of the network flows. In another aspect, network flow data may be obtained from a direct inspection of header information and/or payload information for packets or other data structures contained in the network flows. Thus, the network flow data may include payload data and/or header data for a network flow that is being scored.

As shown in step 304, the method 300 may include identifying a cluster of network flows for analysis. In general, this may include identifying a number of related network flows between a client and server (or other source and destination), such as flows relating to particular machines, particular applications, particular protocols, and so forth. These network flows may be sorted or separated on any corresponding application-by-application basis, protocol-by-protocol basis, or the like.

In order to facilitate this process, an identifier may be created for traffic in a cluster of network flows between a client and a server. This traffic may be identified, e.g., using an identifier that is created for the cluster of flows between a client and server based on a hash of header data or other data for the traffic such as a source Internet Protocol (IP) address, a destination IP address, a destination port, and a protocol. The source and destination addresses couple the identifier to a device (such as an endpoint) and a remote resource (such as a server) being used by the device. The destination port and protocol associated with the network flows couple the identifier to traffic with a particular resource at the destination. While these particular inputs (in this particular order) can usefully identify a source-destination connection for use as described herein, any other data that similarly permits the creation of a cluster-specific identifier may also or instead be used.

A second identifier may be created to distinguish among different flows within the cluster. In order to separate traffic at this level, e.g., the application level on the source device, a hash may be created more specifically using data such as a connection start time, a connection protocol, a source port (on the source device), a destination port, a source IP address, and a destination IP address. While these parameters can be used to identify network flows of a source device on an application-by-application basis, it will be understood that other parameters and/or orders of parameters may also or instead be used, based on the desired clustering relationship(s).

The hashes that are used for identifying these network flows may be any hashes suitable for creating a reproduceable identifier based on a set of ordered inputs, such as a 20-byte SHA1 digest of the data identified above, or any other suitable hash. Where memory or processing constraints are removed, the identifier may be an ordered concatenation of relevant information or other representation. However, the SHA1 digest advantageously compresses this identifying information into a token suitable for use as a (substantially) unique label, index or the like for each network flow. For example, techniques such as those employed in Community ID Flow hashing for monitoring applications such as Zeek™ and Suricata™ may be used to create suitable hashes, with adaptations in the hash inputs to facilitate discrimination among individual flows and flow clusters as contemplated herein. As a specific example, the first hash for the cluster may include an ordered hash of the source IP address for the network flows, the destination IP address for the network flows, the destination port for the network flows, and a Layer 7 protocol for the network flows. The second hash for a flow within the cluster may include an ordered hash of a start time for a connection for the corresponding one of the network flows, the source IP address for the corresponding one of the network flows, the destination IP address for the corresponding one of the network flows, the destination port for the corresponding one of the network flows, a source port for the corresponding one of the network flows, and a Layer 7 protocol for the one or more the network flows.

According to the foregoing, identifying a cluster of network flows between a source associated with an enterprise network and a destination external to the enterprise network may include identifying the cluster of network flows based on at least a source address and a destination address for the network flows, and then identifying a number of network flows in the cluster of network flows between the source and the destination based on at least a source port for each one of the network flows. In a more specific example, this may include creating an identifier for a cluster of network flows between two compute instances using a first hash of at least a source IP address for the network flows, a destination IP address for the network flows, a destination port for the network flows, and a protocol for the network flows, and creating a sub-identifier for each of the network flows in the cluster of network flows using a second hash of at least a source port for a corresponding one of the network flows. The resulting identifiers include a single identifier for the cluster, along with a different identifier for each usefully distinguishable flow within the cluster.

As shown in step 306, the method 300 may include scoring network flows in the cluster. This may include individually scoring each one of the number of network flows in the cluster, which advantageously permits an assessment of risk for each flow separately, based on the characteristics of communications within the flow. For example, this may include scoring each one of the network flows for each one of the sub-identifiers using a metric for each of a number of security risks (such as any of the risk metrics described above), thereby providing a number of scored metrics for each of the network flows, each of the scored metrics evaluating one of the security risks for a corresponding one of the network flows. More generally, this may include scoring each one of the network flows using a metric for each of a number of security risks, or otherwise scoring the individual flows, thereby providing a number of scored metrics for each one of the network flows.

A number of different metrics may be used for this initial scoring. For example, one of the metric scores may be a flag indicating that the source is an only compute instance in the enterprise network communicating with the destination. This indicator of unpopularity can usefully distinguish cases where no other computers within a population (such as an enterprise network of endpoints managed by a threat management facility) are communicating with the destination, which may be an indicator of high risk, particularly when combined with other factors as described herein. As another example, one of the metric scores may be generated by a machine learning algorithm. The machine learning model may individually score the network flows based on any suitable contextual or other data for which the model has been trained, e.g., using training data with labels identifying safe and unsafe code. For example, the machine learning model may score the network flows based on at least one of a domain name (or pattern of domain names) and an encrypted payload analysis, each of which have been demonstrated to provide accurate threat detection in network security contexts. In another aspect, one of the metric scores may be based on a type of threat for one of the network flows, which may be determined using indicators of compromise that are received, e.g., from local security agents executing on endpoints within an enterprise network and tracked by the threat management facility. Threat types may also or instead be determined using industry standard threat frameworks or other local or remote tools and resources for characterizing threat types. In another aspect, one of the metric scores may be based on a count of predetermined events associated with one of the network flows, which may include events detected by devices (such as the source) instrumented with a local security agent or the like to monitor events and provide event data to the threat management facility. This may also or instead include events from other enterprise infrastructure such as a cloud computing platform, hosted application resource, or the like. Thus, for example, where a cloud data storage service or Software-as-a-Service platform provides data or computing resources for the source, these platforms may usefully generate event data that can be used by the threat management facility to evaluate risk, any of which can provide predetermined events used to generate metric scores as contemplated herein. It will be understood that these examples are provided by way of example and not limitation, and that any risk scoring technique suitable for generating risk metric scores that can be used to evaluate riskiness of individual network flows may be adapted as a metric score for use with the techniques described herein.

In one aspect, scoring may include conditionally scoring in different ways depending on the nature of a particular network activity. For example, one scoring technique includes detecting domain generation algorithms (DGAs)—a technique used by advanced persistent threats to automatically and dynamically generate domains for locating a command-and-control center. In general, DGA detection aims at whether a particular domain is likely to have been generated by a machine rather than a person, a detection that may usefully be performed with a machine learning algorithm. However, DGA analysis typically occurs where one of the network flows contains a Domain Name System (DNS) lookup. Thus, the method 300 may include determining whether a network flow contains a DNS query. If so, the method 300 may include scoring for DGA threats, such as by adding a DGA count where a machine learning model provides a DGA detection meeting a predetermined likelihood or threshold. The method 300 may then proceed to the next network flow for analysis. If, on the other hand, the network flow does not contain a DNS query, the method 300 may omit DGA scoring and proceed to scoring any/all of the other flow risks used to evaluate the cluster.

As shown in step 308, the method 300 may include aggregating the risk scores for the number of network flows, e.g., by combining the number of scored metrics for each of the network flows into an aggregated risk score for the cluster of network flows. In one aspect, this may include, for each of the security risks evaluated with a metric, combining a corresponding one of the score metrics for each of the network flows into an aggregated metric score for the cluster, thereby obtaining a number of aggregated metric scores for the cluster. In one aspect, each of these aggregated metric scores may include a weighted combination of an average of score metrics for one of the security risks and a maximum of score metrics for the one of the security risks. This approach permits an aggregated metric score to reflect both a high individual score and a high average score, with the contribution of each controlled by the weighting that is applied. The aggregated risk score for one of these metrics across all of the individual network flows may be calculated using any suitable formula to obtain aggregated metric scores for each risk. Aggregating may then include summing the aggregated metric scores for each of the security risks into an aggregated risk score for the cluster of network flows, which reflects the overall risk of a connection between a source and destination, or client and server, based on these various factors.

According to the foregoing, combining the number of scored metrics into an aggregated score may include calculating an average and a maximum for each of the security risks assessed for each network flow. Combining the number of scored metrics may further include calculating a category risk score for each of the security risks based on a weighted combination of the average and the maximum for that one of the security risks, and then summing the category risk score for each of the security risks to provide the aggregated risk score for the cluster of network flows in the cluster. Other techniques may also or instead be usefully for combining individual, flow-specific (e.g., application-specific or protocol-specific) scores into an aggregated, cluster-level score that permits evaluation of a connection between a source and destination. A number of specific calculations are provided by way of non-limiting examples with reference to FIG. 4 below.

As shown in step 310, the method 300 may include evaluating a risk associated with the cluster of network flows. Where scores have been calculated and aggregated for the cluster, this can be achieved by comparing the aggregated risk score to any suitable risk threshold(s), such as thresholds selected empirically based on comparisons of calculated scores to assessed risks for particular network flows and/or clusters, or thresholds selected based on an assessment or correlation of patterns in network flows associated with known or suspected risky behavior.

As shown in step 312, the method 300 may include comparing the aggregated risk score to a predetermined threshold, which may include a minimum, a maximum, or a range corresponding to the quantitative framework used to calculate the individual and aggregated scores. If the risk does not meet the risk threshold, the method 300 may return to step 306 where scoring of network flows within the cluster may continue. This calculation may be repeated at any suitable interval based on desired sensitivity, amount of scored data, available computing resources, and any other factors. For example, steps 306-312 may be repeated once every minute, once every five minutes, once every ten minutes, once every hour, or on any other interval.

As shown in step 314, if the aggregated risk score meets the predetermined threshold, the method 300 may include initiating remediation. Any of a wide variety of remediation techniques may suitable be employed including, by way of non-limiting examples a remedial action directed to a client that is the source of the network flow, such as a quarantine of the source, termination of network communications by the source, termination of a process or application executing on the source, an increase in local monitoring activity by a local security agent executing on the source, a malware scan of the source, filtering of network activity, and a software update to the source. This may also or instead include an alert to an administrator, a request for virus definition updates, and so forth. In one aspect, remediation may include checking and/or updating software such as security software executing on the device, applications installed on the device, an operating system executing on the device, and so forth, as well as issuing and installing security patches or fixes. In another aspect, remediation may include policy-related remediation such as updating security policies for compute instances, users, applications, or the like to impose stricter controls or limits on activity including, e.g., limits on network activity (bandwidth, data quotas, permitted network addresses, etc.), limits on system changes (e.g., registry entries, certain system calls, etc.), limits on file activity (e.g., changes to file permissions), increased levels of local activity monitoring, and so forth. This may also or instead include selecting from among two or more remediation techniques based on the aggregated risk score or one or more components thereof. More generally, any remedial action or combination of remedial actions suitable for a specific security risk or a level of threat may be initiated in response to the aggregated risk score meeting the predetermined threshold.

As a significant advantage, the foregoing technique permits an assessment of risk without the identification of a particular, known malware instance. The methods and systems described herein may be used in combination with other techniques that directly identify specific, known exploits, and can usefully supplement such techniques by identifying circumstances where a pattern of communications within or associated with network flows contains a number of different risk factors that cumulatively suggest malicious activity even where no specific threat has yet been identified.

According to the foregoing, there is described herein a system including a source, a destination, and a threat management facility. The source may include a compute instance associated with an enterprise network. The destination may include a server external to the enterprise network. The threat management facility may be a threat management facility for the enterprise network, and may be configured by computer executable code to monitor a connection between the client and the server, and to assess risks associated with the connection. More specifically, the threat management facility may be configured to perform the steps of identifying a cluster of network flows between the source and the destination based on at least a source address and a destination address for the network flows, identifying a number of network flows in the cluster of network flows between the source and the destination based on at least a source port for each one of the network flows, scoring each one of the network flows using a metric for each of a number of security risks, thereby providing a number of scored metrics for each one of the network flows, combining the number of scored metrics for each of the network flows into an aggregated risk score for the cluster of network flows, and initiating a remedial action when the aggregated risk score meets a predetermined threshold.

In one aspect, the destination may be a server external to the enterprise network. The system may also include a network device between the destination and the source that provides network flow data to the threat management facility to facilitate scoring. In one aspect, scoring each one of the network flows may include scoring each one of the network flows with a machine learning algorithm trained to evaluate network flows for severity of security risk.

Figure 4:
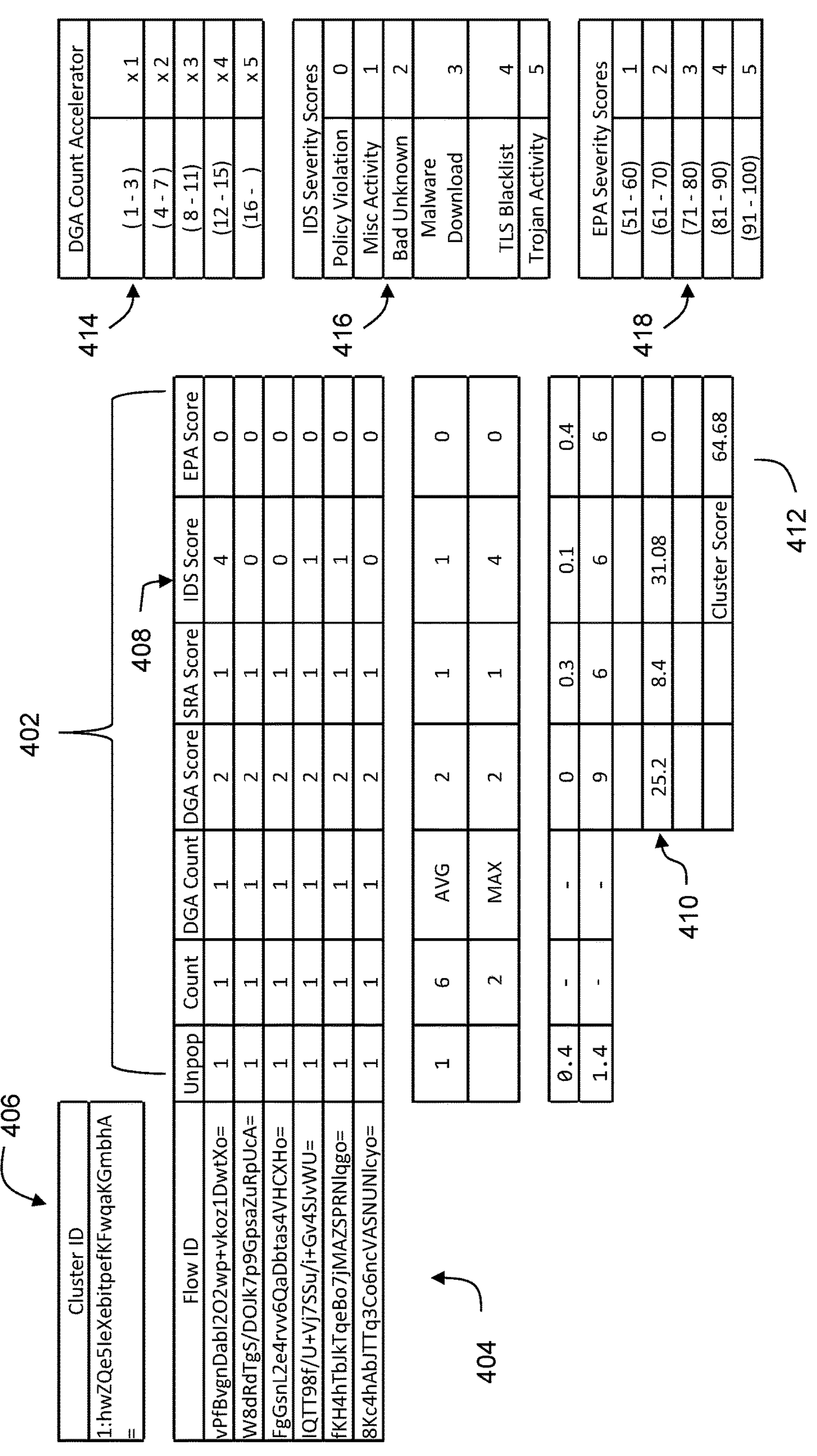
FIG. 4 illustrates a scoring calculation for network flows.

FIG. 4 illustrates a scoring calculation for network flows. In general, the calculation may be based on metric scores 402 for a number of network flows, each identified by a flow identifier 404, and each associated with a network cluster identified by a cluster identifier 406. The cluster identifier 406 and flow identifier 404 may be calculated using any of the hashing techniques described herein, or any other technique or combination of techniques that permits an identification of, and discrimination among, numerous network flows, such as application-specific or protocol-specific network flows within a cluster of communications between a pair of devices. As described herein, separating flows in this manner advantageously supports an independent evaluation of each network flow using a number of different risk assessment tools, while combining all available diagnostic data across the network flows into an integrated view of the cluster. Each metric score represents a different evaluation of one of the network flows. The individual calculations for each flow based on each metric can then be combined (as represented moving vertically through one of the columns 408 for each metric) using scaling, averaging, weighting, and any other operations, to obtain a score for the cluster of flows for that metric. Each such score may be weighted as desired, e.g., based on empirical observations of actual malicious code, empirical assessments of known or suspected risky behavior, events or actions associated with the sources of various scores, and so forth. The score for each metric can then be summed (as represented moving horizontally along the last row 410), to obtain an aggregated cluster score 412 representing an overall risk associated with the cluster of network flows between two devices. It will be appreciated that any number of different metrics may be evaluated for the purposes of evaluating a particular network flow. The following examples provide a non-limiting and non-exhaustive collection of objective metrics associated with potential risks and useful for distinguishing between safe and risky network flows.

In one aspect, the metric scores may include an unpopularity score. This metric represents the rarity of a destination address by setting a binary flag equal to one when the source device for the network flow is the only device in a population (such as endpoints in an enterprise network) communicating with the destination device. The flag is set equal to zero when more than one device in the population is communicating with the destination device. The counts for unpopularity may be summed, averaged, or otherwise aggregated into a total unpopularity score. A scale (0.4, in the figure) may be provided as a multiplier for the total, or in the example calculation, as a constant in a formula (for example, x=1+average (unpopularity)*constant) used to evaluate the unpopularity score, in this case yielding an unpopularity score for all of the network flows of 1.4. It will be noted that the unpopularity average will typically be 1 or 0 where the network flows within the cluster are addressed to the same destination.

As another example, machine learning detections of various types may be counted and aggregated into a risk metric. For example, the machine learning algorithm may be trained to detect the use of a domain generation algorithm (DGA)—a technique used by malware to dynamically generate domains when trying to locate and connect to a command and control center. Machine learning algorithms are generally good at detecting DGA usage, but they can also generate a large number of positive detections, and sometimes a large number of false detections. At the same time, the number of detections can be indicative of relative risk. In order to account for various detection patterns, a DGA count algorithm may start with a raw count (the column labelled "Count") of the number of DGA detections by a machine learning algorithm for each network flow. As illustrated moving vertically through the count column, these counts may be summed, and then a DGA count accelerator may be determined using range-based binning 414. In the illustration, a total count of 6 results in a DGA count accelerator of 2 based on the range-based binning 414. The resulting DGA count accelerator is then applied to the "DGA Count" (which is the same initial value as the "Count") for each network flow, e.g. using a product of the DGA Count and the DGA accelerator, to provide a DGA score for each network flow. Moving down the DGA Score column, an average of 2 and a maximum of 2 are calculated for the DGA count of each of the network flows, and user-provided weights of 0 and 9 are provided. The total DGA score can then be calculated using the following formula:

$$DGA=[DGA_{avg}*w_1+DGA_{max}*(1-w_1)]*w_2*Unpop \quad \text{[Eq. 1]}$$

where $DGA_{avg}$=the DGA count average, $DGA_{max}$=the DGA count maximum, $w_1$ and $w_2$ are user provided weights, and Unpop=the unpopularity score provided above It will be noted that unpopularity is factored into this formula because unpopularity may be particularly significant when it occurs within a pattern of domains that suggest the use of a domain generation algorithm. It will also be noted that, while a number of weighting schemes may be used, in Eq. 1 the first weight, $w_1$, represents a relative weighting between the average score and the maximum score, and the second weight, $w_2$, represents a relative contribution of the DGA Score to the cluster score for the cluster of network flows. Applying this formula to the DGA values in the figure yields a DGA Score for the cluster of 25.2. Other weights, formulas, and factors may be used in calculating a DGA score for network flows and a cluster as contemplated herein. Also as noted above, in one aspect, DGA scoring may usefully be performed instead of, rather than in addition to, other risk scoring, e.g., when a network flow contains a DNS query with a Uniform Resource Locator or other identifier that should be evaluated for usage of domain generation algorithms.

As another example, a session risk analytics (SRA) score may be evaluated for each network flow. This may, for example, be a score provided by any suitable local or third party service that evaluates risks for a communications session between two devices based on available flow data, contextual data, and the like. Individual scores may be combined using any formula, along with user-provided weights. For example, the total SRA Count for a cluster may be calculated as follows:

$$SRA=[SRA_{avg}*w_1+SRA_{max}*(1-w_1)]*w_2*Unpop \quad \text{[Eq. 2]}$$

where $SRA_{avg}$=the SRA count average, $SRA_{max}$=the SRA count maximum, $w_1$ and $w_2$ are user provided weights, and Unpop=the unpopularity score provided above It will be noted that, once again, unpopularity may be used to scale the risk score.

In another example, an intrusion detection system (IDS) score may be evaluated for each network flow. This score may, for example, be based on indicators of compromise (IOCs) detected within the enterprise and transmitted to the threat management facility, such as security events detected by local security agents executing on endpoints within the enterprise network. These IOCs may be evaluated by an IDS engine to classify the type of malicious activity and assign a corresponding risk score based on the type. In use, the IDS engine may look first for the riskiest activity (e.g., Trojan Activity in the figure), and where this is not detected based on a current group of indicators of compromise, the IDS engine may proceed to progressively less risky activity types. This approach advantageously permits the IDS engine to stop analysis as soon as an activity is detected, while avoiding the possibility of overlooking riskier threats that might be suggested by the IOCs. As illustrated in FIG. 4, a table 416 of threat types and corresponding scores can facilitate a lookup of a suitable score for a set of IOCs based on the classification of type assigned by the intrusion detection engine. A formula similar to those provided above for SRA scores (Eq. 2) and DGA scores (Eq. 1) may then be applied to the IDS scores for each network flow, in this case yielding an IDS score average of 1, an IDS score maximum of 4, and a total IDS score of 31.08 for the cluster of network flows.

As another example, an encrypted payload analytics (EPA) score may be evaluated for each network flow. In general, features of bytes and byte streams contained in an encrypted flow may have characteristic patterns that facilitate detection of potential threats. In one aspect, a machine learning model may be trained to receive payload data from a network flow, and to provide a score of threat severity from, e.g., 0-100. This output may be scaled, for example using range-based binning 418 to a range such as 0-5 as illustrated in the figure. A formula similar to those provided above for SRA scores (Eq. 2) and DGA scores (Eq. 1) above may then be applied to the EPA scores for each network flow, in this case yielding an IDS score average of 0, an IDS score maximum of 0, and a total IDS score of 0 for the cluster of network flows.

After each metric score is aggregated for each network flow, the metric scores may be combined to obtain a cluster score 412. In this case, the cluster score is calculated as a sum of the DGA score, the SRA Score, the IDS Score, and the EPA Score, however, other metric scores may be included, and other formulas may be applied to combine the metric scores into an aggregated risk score for the cluster of network flow. As described above, this general approach permits each network flow to be independently evaluated based on its own characteristics, while still combining all available data for all network flows between two devices into a single risk evaluation for the aggregated communication session.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer-readable medium that, when executing on one or more computing devices, causes the one or more computing devices to perform the steps of:

creating an identifier for a cluster of network flows between two compute instances using a first hash of at least a source Internet Protocol (IP) address for the network flows, a destination IP address for the network flows, a destination port for the network flows, and a protocol for the network flows;

creating a plurality of sub-identifiers to sort the cluster of network flows on an application-by-application basis, wherein:

each one of the plurality of sub-identifiers is associated with one of a plurality of applications executing on one of the compute instances, each one of the plurality of sub-identifiers identifies the one of the plurality of applications executing on the one of the compute instances using a second hash, and the second hash is based on at least a source port for a corresponding one of the network flows associated with one of the applications;

scoring each one of the network flows identified by one of the sub-identifiers, wherein scoring includes using a metric for each of a number of security risks associated with a corresponding application for the one of the sub-identifiers, thereby providing a number of scored metrics for each of the network flows, each of the scored metrics evaluating one of the security risks for one of the plurality of applications in a corresponding one of the network flows, wherein at least one of the number of scored metrics combines a plurality of application-specific scores associated with one of the plurality of sub-identifiers into an aggregated application-level score for a network flow between the two compute instances;

for each of the security risks, combining a corresponding one of the score metrics for each of the network flows identified by one of the sub-identifiers into an aggregated metric score for one of the applications, thereby obtaining a number of aggregated metric scores for the one of the applications;

summing the aggregated metric scores for each of the applications identified by one of the sub-identifiers into an aggregated risk score for the cluster of network flows; and initiating a remedial action when the aggregated risk score meets a predetermined threshold.

2. The computer program product of claim 1, wherein each of the number of aggregated metric scores includes a weighted combination of an average of score metrics for the one of the security risks and a maximum of score metrics for the one of the security risks.

3. The computer program product of claim 2, wherein the aggregated risk score is calculated based on a sum of the weighted combination.

4. The computer program product of claim 1, wherein the first hash includes an ordered hash of the source IP address for the network flows, the destination IP address for the network flows, the destination port for the network flows, and a Layer 7 protocol for the network flows.

5. The computer program product of claim 1, wherein the second hash includes an ordered hash of a start time for a connection for the corresponding one of the network flows, the source IP address for the corresponding one of the network flows, the destination IP address for the corresponding one of the network flows, the destination port for the corresponding one of the network flows, a source port for the corresponding one of the network flows, and a Layer 7 protocol for the one of the network flows.

6. A method comprising:

identifying a cluster of network flows between a source associated with an enterprise network and a destination external to the enterprise network based on at least a source address and a destination address for the network flows;

identifying a number of network flows in the cluster of network flows between the source and the destination, wherein each of the number of network flows is associated with one of a plurality of applications, and wherein each one of the plurality of applications associated with one of the network flows is identified based on a hash of at least a source port for a corresponding one of the network flows;

scoring each one of the network flows identified based on the hash of at least the source port for the corresponding one of the network flows using a metric for each of a number of security risks associated with a corresponding application for the corresponding one of the network flows, thereby providing a number of scored metrics for each one of the network flows, wherein at least one of the number of scored metrics combines a plurality of application-specific scores associated with the hash into an aggregated application-level score for network flow between the source and the destination;

combining the number of scored metrics for each of the network flows into a risk score for each of the plurality of applications based on the hash associated with each of the network flows;

combining the risk score for each of the plurality of applications into an aggregated risk score for the cluster of network flows; and initiating a remedial action when the aggregated risk score meets a predetermined threshold.

7. The method of claim 6, wherein the source includes a client associated with the enterprise network and the destination includes a server externally coupled to the enterprise network.

8. The method of claim 7, wherein the remedial action includes a remedial action directed to the client.

9. The method of claim 6, wherein the remedial action includes one or more of a quarantine of the source, a malware scan of the source, a software update to the source, and an alert to an administrator.

10. The method of claim 6, wherein combining the number of scored metrics includes calculating an average and a maximum for each of the security risks assessed for each network flow.

11. The method of claim 10, further comprising calculating a category risk score for each of the security risks based on a weighted combination of the average and the maximum for that one of the security risks.

12. The method of claim 11, further comprising summing the category risk score for each of the security risks to provide an aggregated category risk score for one of the plurality of applications identified based on the hash of at least the source port for corresponding ones of network flows in the cluster.

13. The method of claim 6, wherein one of the metric scores is a flag indicating that the source is an only compute instance in the enterprise network communicating with the destination.

14. The method of claim 6, wherein one of the metric scores is generated by a machine learning algorithm.

15. The method of claim 14, wherein the machine learning algorithm scores the network flows based on a domain name or an encrypted payload analysis.

16. The method of claim 6, wherein one of the metric scores is based on a type of threat for one of the network flows determined using indicators of compromise.

17. The method of claim 6, wherein one of the metric scores is based on a count of predetermined events associated with one of the network flows.

18. A system comprising:

a source including a compute instance associated with an enterprise network;

a destination including a server; and a threat management facility for the enterprise network, the threat management facility configured to monitor a connection between the compute instance and the server, and to assess risks associated with the connection by performing the steps of:

identifying a cluster of network flows between the source and the destination based on at least a source address and a destination address for the network flows;

identifying a number of network flows in the cluster of network flows between the source and the destination, wherein each of the number of network flows is associated with one of a plurality of applications, and wherein each one of the plurality of applications associated with one of the network flows is identified based on a hash of at least a source port for a corresponding one of the network flows;

scoring each one of the network flows identified based on the hash of at least the source port for the corresponding one of the network flows using a metric for each of a number of security risks associated with a corresponding application for the corresponding one of the network flows, thereby providing a number of scored metrics for each one of the network flows, wherein at least one of the number of scored metrics combines a plurality of application-specific scores associated with the hash into an aggregated application-level score for network flow between the source and the destination;

combining the number of scored metrics for each of the network flows into a risk score for each of the plurality of applications based on the hash associated with each of the network flows;

combining the risk score for each of the plurality of applications into an aggregated risk score for the cluster of network flows; and initiating a remedial action when the aggregated risk score meets a predetermined threshold.

19. The system of claim 18, wherein the destination is a server external to the enterprise network.

20. The system of claim 18, wherein scoring each one of the network flows includes scoring each one of the network flows with a machine learning algorithm trained to evaluate network flows for severity of security risk.

* * * * *